(12) United States Patent
Xu et al.

(10) Patent No.: US 9,049,715 B2
(45) Date of Patent: *Jun. 2, 2015

(54) IN A RADIO NETWORK ENVIRONMENT, REDUCING INTERFERENCE AMONG OVERLAPPING CELLS

(75) Inventors: Ning Xu, Beijing (CN); Jin Yang, Beijing (CN)

(73) Assignee: Google Technology Holdings LLC, Mountain View, CA (US)

(*) Notice: Subject to any disclaimer, the term of this patent is extended or adjusted under 35 U.S.C. 154(b) by 120 days.

This patent is subject to a terminal disclaimer.

(21) Appl. No.: 13/414,799

(22) Filed: Mar. 8, 2012

(65) Prior Publication Data

US 2013/0130699 A1    May 23, 2013

Related U.S. Application Data

(63) Continuation of application No. 12/534,995, filed on Aug. 4, 2009, now Pat. No. 8,160,591.

(51) Int. Cl.
*H04W 36/00*   (2009.01)
*H04W 72/04*   (2009.01)
*H04W 16/02*   (2009.01)
*H04W 84/04*   (2009.01)

(52) U.S. Cl.
CPC .......... *H04W 72/0426* (2013.01); *H04W 16/02* (2013.01); *H04W 84/045* (2013.01)

(58) Field of Classification Search
CPC ..... H04W 16/02; H04W 40/12; H04W 40/16; H04W 28/0231; H04W 28/0236; H04W 52/24; H04W 42/241; H04W 52/243; H04W 52/244; H04W 72/0426; H04W 72/082; H04W 72/085; H04W 84/045
USPC .......... 455/443–444, 446–454; 370/322, 329, 370/341

See application file for complete search history.

(56) References Cited

U.S. PATENT DOCUMENTS

2007/0242769 A1    10/2007  Yang
2007/0258529 A1*   11/2007  Liang et al. ................... 375/260

(Continued)

FOREIGN PATENT DOCUMENTS

WO    2005062798 A2    7/2005

OTHER PUBLICATIONS

Bin Fan et al., "A Dynamic Resource Allocation Scheme Based on Soft Frequency Reuse for OFDMA Systems," IEEE 2007 International Symposium on Microwave, Antenna, Propagation, and EMC Technologies for Wireless Communications, Aug. 16-17, 2007, pp. 1-4.

(Continued)

*Primary Examiner* — George Eng
*Assistant Examiner* — Marcus Hammonds
(74) *Attorney, Agent, or Firm* — Lerner, David, Littenberg, Krumholz & Mentlik, LLP

(57) ABSTRACT

Disclosed is a method for a femtocell to reduce interference with an overlapping macrocell. The femtocell determines soft-frequency-reuse ("SFR") information of the macrocell. From that information, the femtocell determines which frequency sub-channels are assigned by the macrocell for its cell-center users and which frequency sub-channels are assigned for cell-edge users. (Cell-edge users are given a higher transmission power profile in order to overcome potential interference with neighboring macrocells.) Then, the femtocell selects from the cell-center user frequency sub-channels for transmission to the femtocell's users. By transmitting on the cell-center user frequency sub-channels, the femtocell reduces interference with the overlapping macrocell. The femtocell continues to update its knowledge of the macrocell's SFR information and re-assigns frequency sub-channels as the SFR changes. If the macrocell detects that one of its cell-center users is "close enough" to the femtocell, then the macrocell re-assigns the cell-center user as a cell-edge user to overcome interference.

2 Claims, 6 Drawing Sheets

(56) References Cited

U.S. PATENT DOCUMENTS

| | | | |
|---|---|---|---|
| 2008/0095100 A1 | 4/2008 | Cleveland et al. | |
| 2009/0040972 A1 | 2/2009 | Robson et al. | |
| 2009/0081970 A1 | 3/2009 | Yavuz et al. | |
| 2009/0291690 A1 | 11/2009 | Guvenc et al. | |
| 2010/0061278 A1* | 3/2010 | McCoy | 370/277 |
| 2010/0075689 A1* | 3/2010 | Uemura et al. | 455/452.1 |
| 2010/0120438 A1* | 5/2010 | Kone et al. | 455/444 |
| 2010/0267338 A1 | 10/2010 | Chiu et al. | |
| 2010/0278141 A1* | 11/2010 | Choi-Grogan et al. | 370/331 |
| 2011/0002284 A1* | 1/2011 | Talwar et al. | 370/329 |
| 2011/0019715 A1* | 1/2011 | Brisebois | 375/130 |
| 2011/0034174 A1* | 2/2011 | Xu et al. | 455/447 |
| 2011/0149879 A1 | 6/2011 | Noriega et al. | |
| 2011/0211488 A1* | 9/2011 | Kwon et al. | 370/252 |

OTHER PUBLICATIONS

Ubiquisys Ltd., "Femto Cell Radio Resource Management (RRM) and Interference management White Paper," UbiquiSys Ltd., 2007, pp. 1-5.

3rd Generation Partnership Project, "3GPP TS 36.300 v8.6.0—X2 Application Protocol (X2AP)—Release 8," 3rd Generation Partnership Project, Technical Specification Group Radio Access Network; Evolved Universal Terrestrial Radio Access Network (E-UTRAN); Sep. 2008, 6 pages.

3rd Generation Partnership Project, "3GPP TS 36.423 v8.3.0—Overall Description; Stage 2—Release 8," 3rd Generation Partnership Project, Technical Specification Group Radio Access Network; Evolved Universal Terrestrial Radio Access (E-UTRA) and Evolved Universal Terrestrial Radio Access Network (E-UTRAN); Sep. 2008, 8 pages.

Mariana Goldhamer: "Control channel allocation for femto-cells (IEEE C802.16-08/1350r1)", Internet Citation Oct. 31, 2008, Retrieved from the Internet: URL:http://wwww.ieee802.org/16/tgm/contrib/[retrieved on 2010-0302], pp. 1-8.

Huawei: "Soft Frequency Reuse Scheme for UTRAN LTE", 3GPP TSG RAN WG1 Meeting #41, R1-050507, Athens, Greece, May 9-13, 2005, all pages.

\* cited by examiner

IN A RADIO NETWORK ENVIRONMENT, REDUCING INTERFERENCE AMONG OVERLAPPING CELLS

FIELD OF THE INVENTION

The present invention is related generally to radio communications and, more particularly, to reducing interference among cellular transmitters.

BACKGROUND OF THE INVENTION

In a radio networking environment that re-uses frequencies (e.g., a cellular telephony and data network), a mobile device often simultaneously receives signals from multiple transmitters even though the mobile device is normally only in active communications with one transmitter at a time. The mobile device monitors the strength of these signals. When the strength of a signal becomes greater than the strength of the signal received from the transmitter with which the mobile device is actively communicating, then the mobile device is "handed off" from its current transmitter to the transmitter with the stronger signal. (Note that the strength of the signal as measured by the mobile device typically becomes stronger or weaker as the mobile device moves nearer to, or farther from, respectively, the transmitter.) The mobile device then actively communicates with the new transmitter. The mobile device continues to monitor the strengths of the signals it receives and may be handed off to yet another transmitter.

This hand-off method allows the mobile device to advantageously direct its communications to the transmitter with the strongest signal (which is usually the nearest transmitter). The method also provides the benefit of reduced interference. When the mobile device receives signals from multiple transmitters, the signals from all transmitters other than the one with which the mobile device is actively communicating can interfere with the transmissions between the mobile device and its chosen transmitter. The amount of interference grows as the strength of the interfering signal becomes greater (e.g., as the mobile device moves closer to the interfering transmitter). In the hand-off method described above, interference problems are resolved because the mobile device eventually switches to the transmitter with the strongest signal. Thus, what was once the greatest source of interference becomes the mobile device's communications partner, eliminating this transmitter as a source of interference.

This hand-off method provides the interference-reduction benefits only if the communications network permits the mobile device to be handed off to the transmitter with the strongest signal. While this is generally the case, it may not be the case when a transmitter's signal overlaps with the signal from a "private" transmitter. For purposes of the present discussion, we use the terminology of cellular networks: The "normal" or non-private transmitters are called "macrocell" transmitters, and the private transmitter is called a "femtocell" transmitter. The provider of the femtocell may secure it so that the femtocell does not allow itself to become the active transmitter for every mobile device that comes along. (Often, this means that the femtocell will only host those mobile devices that know how to log into the femtocell using well known authentication and security protocols.) Although femtocells usually transmit at much lower power levels than used by macrocell transmitters, when a mobile device moves "close enough" to the femtocell transmitter, the signal of the femtocell can become a source of interference that current hand-off methods cannot address. In some cases, the interference is so bad that it creates a "coverage hole" in the macrocell.

Repeating the above example with a little more detail, a mobile device moves toward a secured femtocell transmitter until the femtocell's signal interferes with (or potentially interferes with) the mobile device's communications with a macrocell transmitter. This particular mobile device is not authorized to access the femtocell and thus cannot be handed off to the femtocell. The mobile device must continue to communicate with its macrocell transmitter even though the signal received from the macrocell may be weaker than the signal received from the closer femtocell. The interference from the femtocell grows and cannot be relieved by current methods. As a corollary, the transmissions between the mobile device and its macrocell may interfere with transmissions between the femtocell and its devices.

BRIEF SUMMARY

The above considerations, and others, are addressed by the present invention, which can be understood by referring to the specification, drawings, and claims. According to aspects of the present invention, a femtocell in an overlapping macrocell determines the soft-frequency-reuse ("SFR") information of the overlapping macrocell. From that SFR information, the femtocell determines which frequency sub-channels are assigned by the macrocell for its cell-center users (e.g., mobile devices or cellular-equipped laptop computers) and which frequency sub-channels are assigned for cell-edge users. (The cell-edge users are usually given a higher transmission power profile by the macrocell in order to overcome potential interference with neighboring macrocells.) Then, the femtocell selects from the cell-center user frequency sub-channels (that is, from the lower power ones) for transmission to the femtocell's users (that is, to those mobile devices that are both authorized to access the femtocell and are currently accessing the femtocell). By transmitting on the cell-center user frequency sub-channels, the femtocell reduces interference with the transmissions of the overlapping macrocell.

The femtocell continues to update its knowledge of the macrocell's SFR information and re-assigns frequency sub-channels as the SFR changes.

Known cellular-communications techniques can be used by the femtocell to determine the macrocell's SFR information. For example, the femtocell can use backhaul communications to receive Relative-Narrowband-TX-Power-Indicator messages over an X2 interface in 3GPP LTE systems. The femtocell can also directly measure the macrocell's downlink reference signals.

In a compatible method, the macrocell in some embodiments assigns the frequency sub-channels for use by its cell-center users and by its cell-edge users as discussed above. If the macrocell detects that one of its cell-center users is "close enough" to the femtocell, then the macrocell re-assigns the cell-center user as a cell-edge user (that is, the macrocell re-assigns the user to a frequency sub-channel with greater power) to overcome interference. In an alternative embodiment, the macrocell divides the frequency sub-channels assigned for use by cell-center users into two subsets. Frequency sub-channels in a first subset are assigned a higher power. When the macrocell detects that the cell-center user is "close enough" to the femtocell, the cell-center user is assigned to a frequency sub-channel in the first (i.e., higher power) subset to overcome interference.

The macrocell can determine that its cell-center user is "close enough" to the femtocell by first receiving from the user a neighbor list, the neighbor list including the femtocell. The user tells the macrocell the strength of the signals received from its neighbors and, in particular, from the femtocell. The user is "close enough" to the femtocell when the strength of the signal received from the femtocell is above a threshold.

BRIEF DESCRIPTION OF THE SEVERAL VIEWS OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

Figure 1A:
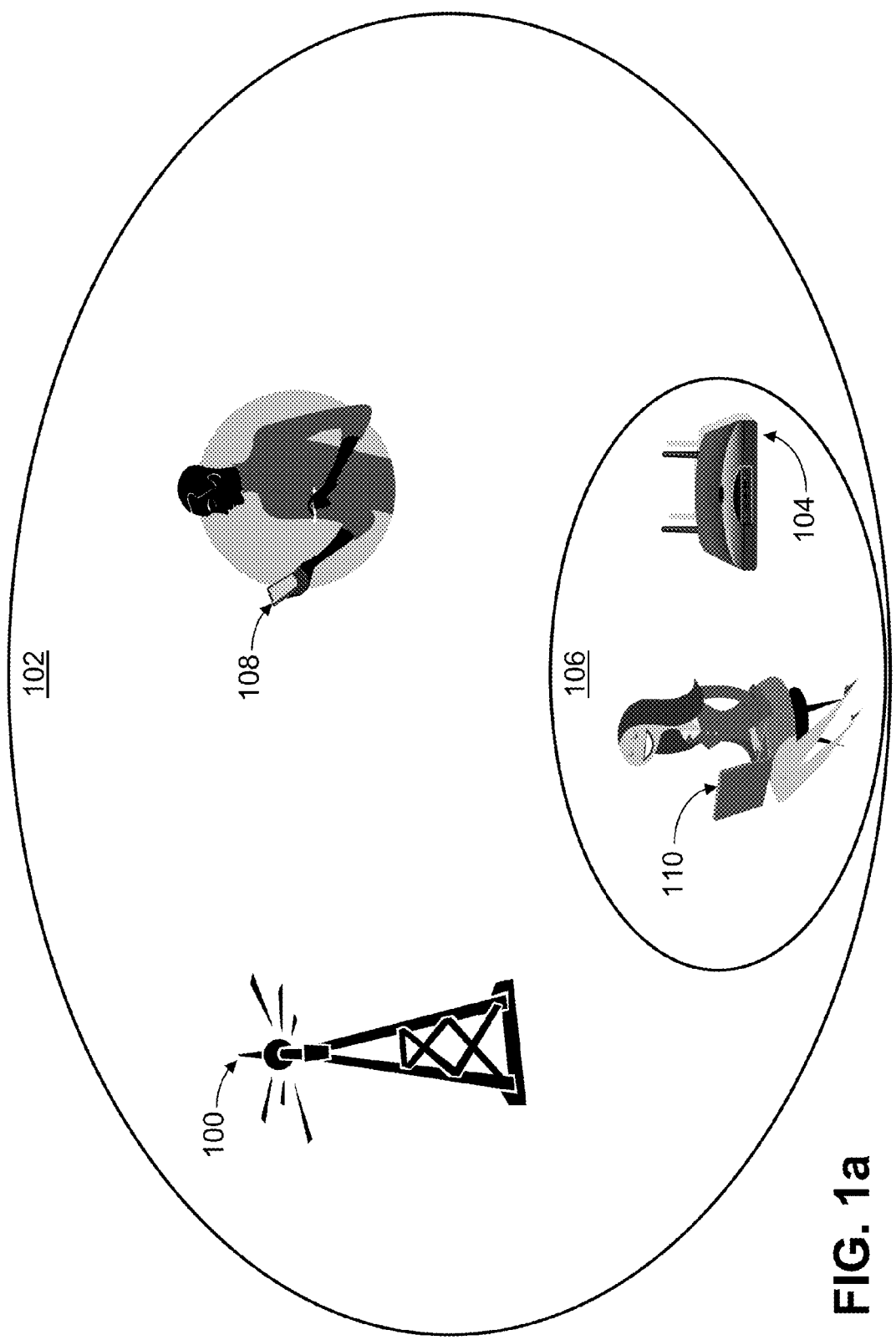
FIGS. 1a and 1b are overviews of representational environments wherein a macrocell overlaps a femtocell.

Turning to the drawings, wherein like reference numerals refer to like elements, the invention is illustrated as being implemented in a suitable environment. The following description is based on embodiments of the invention and should not be taken as limiting the invention with regard to alternative embodiments that are not explicitly described herein.

FIG. 1a shows a frequency reuse communications environment. A controller 100 (with its associated infrastructure elements as known in the art) communicates over a geographical region 102. Because most frequency reuse environments in today's world are based on cellular-radio technology, the present description uses cellular terminology and calls the controller 100 a "macrocell controller" and calls the geographic region over which it communicates a "macrocell." Please note, however, that the present invention is not limited to particular technologies and embodiments associated with the term "cellular" but applies to any frequency reuse communications environment.

For ease of discussion, the word "macrocell" used alone sometimes refers to the macrocell controller 100 (as in "the macrocell 100 assigns frequencies") and sometimes to the geographical region 102 (as in "the mobile device 108 moves to the edge of the macrocell 102"). The use of "macrocell" is always clear from the context.

In FIG. 1a, a femtocell controller 104 communicates over a small geographical region 106 that overlaps with the macrocell region 102. (Here again, the word "femtocell" in the present discussion sometimes refers to the femtocell controller 104 and sometimes to the femtocell region 106.)

A person is shown using a communications-equipped device 108. The device 108 can be anything equipped to communicate with the macrocell 100. Typical devices 108 include cellular telephones, personal digital assistants, laptop computers, and other computing devices either mobile or fixed in place. Because the device 108 communicates with the macrocell 100, the present discussion calls the device 108 a "user" of the macrocell 100. Note that in the present discussion, the word "user" is reserved for a communications device rather than a human being.

FIG. 1a also shows a user 110 of the femtocell 104. The femtocell 104 may be configured to allow access only to certain users. To use the communications services provided by the femtocell 104, the user 110 may need to authenticate itself as a registered user. Suitable authentication techniques are well known in the art.

Figure 1B:
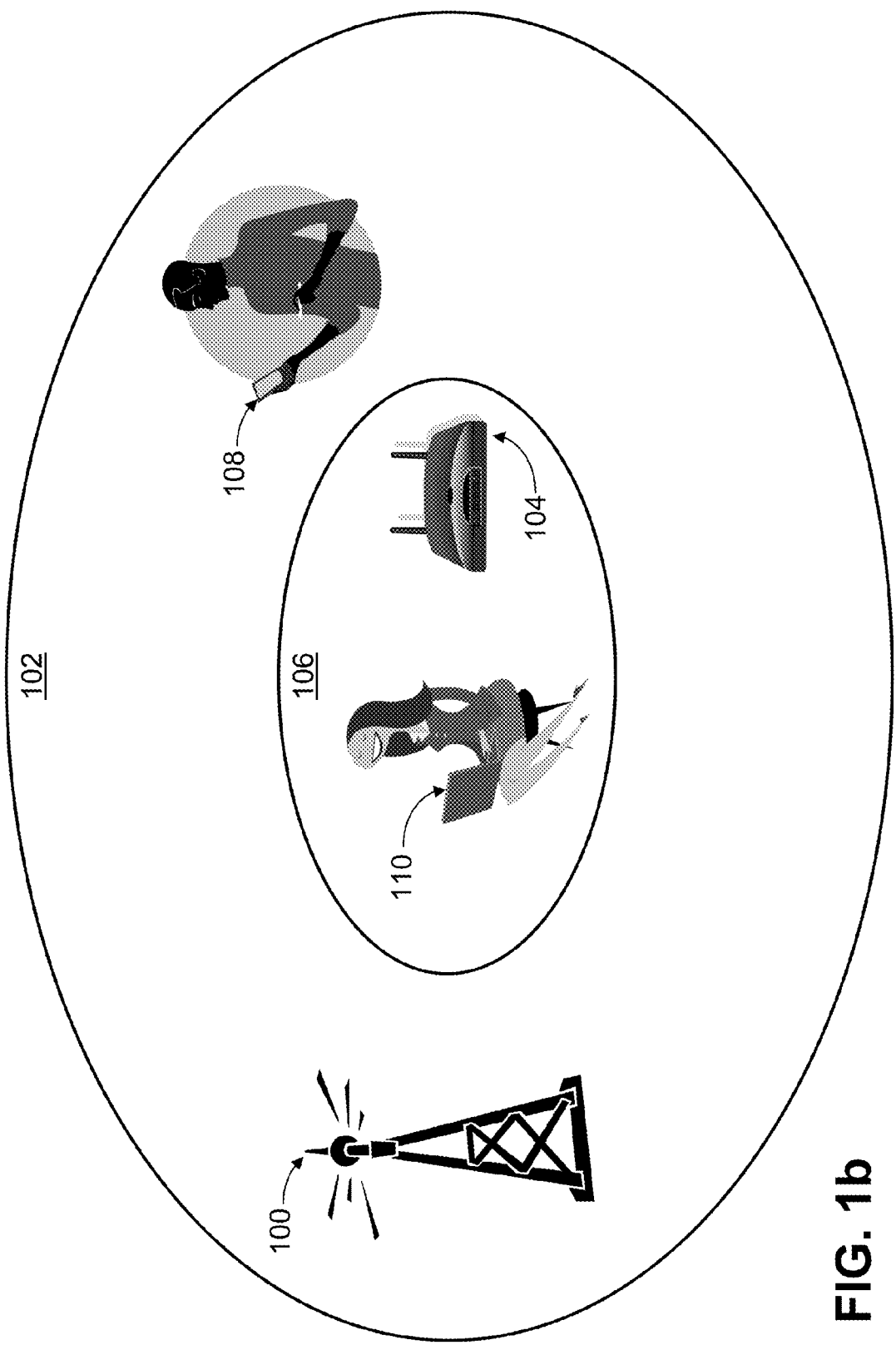

The femtocell 106 of FIG. 1a is shown wholly contained in, and near the edge of, the macrocell 102. (From a practical point of view, "near the edge of the macrocell 102" means "far from the macrocell controller 100 but still within communications range of it.") That need not be the case. The important point is that there is some overlap of the macrocell region 102 with the femtocell region 106. FIG. 1b shows a slightly different communications environment wherein the femtocell 106 is near the center of the macrocell 102. ("Near the center of the macrocell 102" means "near the macrocell controller 100.") Some embodiments of the present invention treat the environments of FIGS. 1a and 1b differently, as is discussed fully below.

Figure 2:
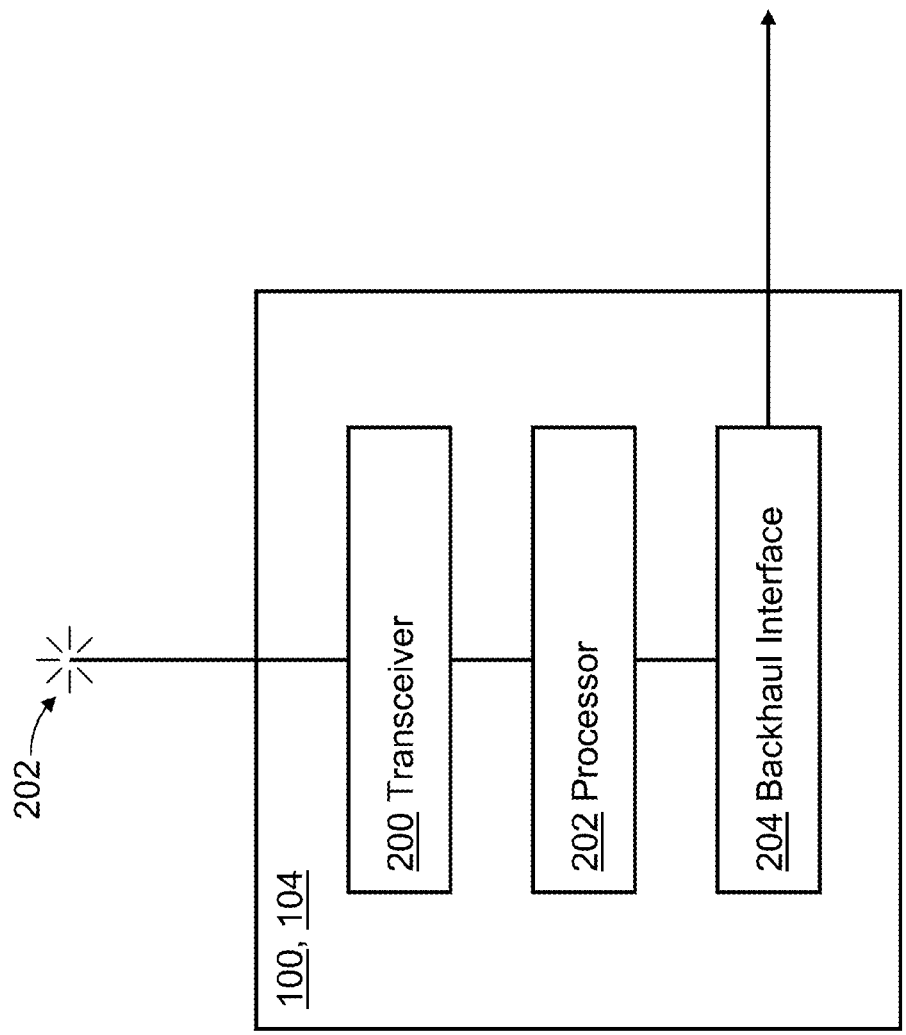
FIG. 2 is a schematic diagram of a controller for either a femtocell or a macrocell.

A very simplified view of the functional components of the macrocell 100 and femtocell 104 controllers is presented in FIG. 2. In reality, the network infrastructure supporting a frequency reuse communications environments is often extremely complex and involves numerous hardware devices, software and firmware programs, and communications protocols connecting everything together. Details of this infrastructure are well known in the art, so the present discussion is free to focus on just those aspects that are modified by embodiments of the present invention.

The controller 100, 104 of FIG. 2 communicates with its users 108, 110 by means of a communications transceiver 200 and an antenna 202. Communications are under the control of a processor 202. Some, but not all, controllers 100, 104 include a backhaul interface 204 that allows the controller 100, 104 to communicate with other infrastructure devices in the frequency reuse communications environment. As one example, the backhaul interface can be the well known X2 interface in 3GPP LTE systems.

Figure 3:
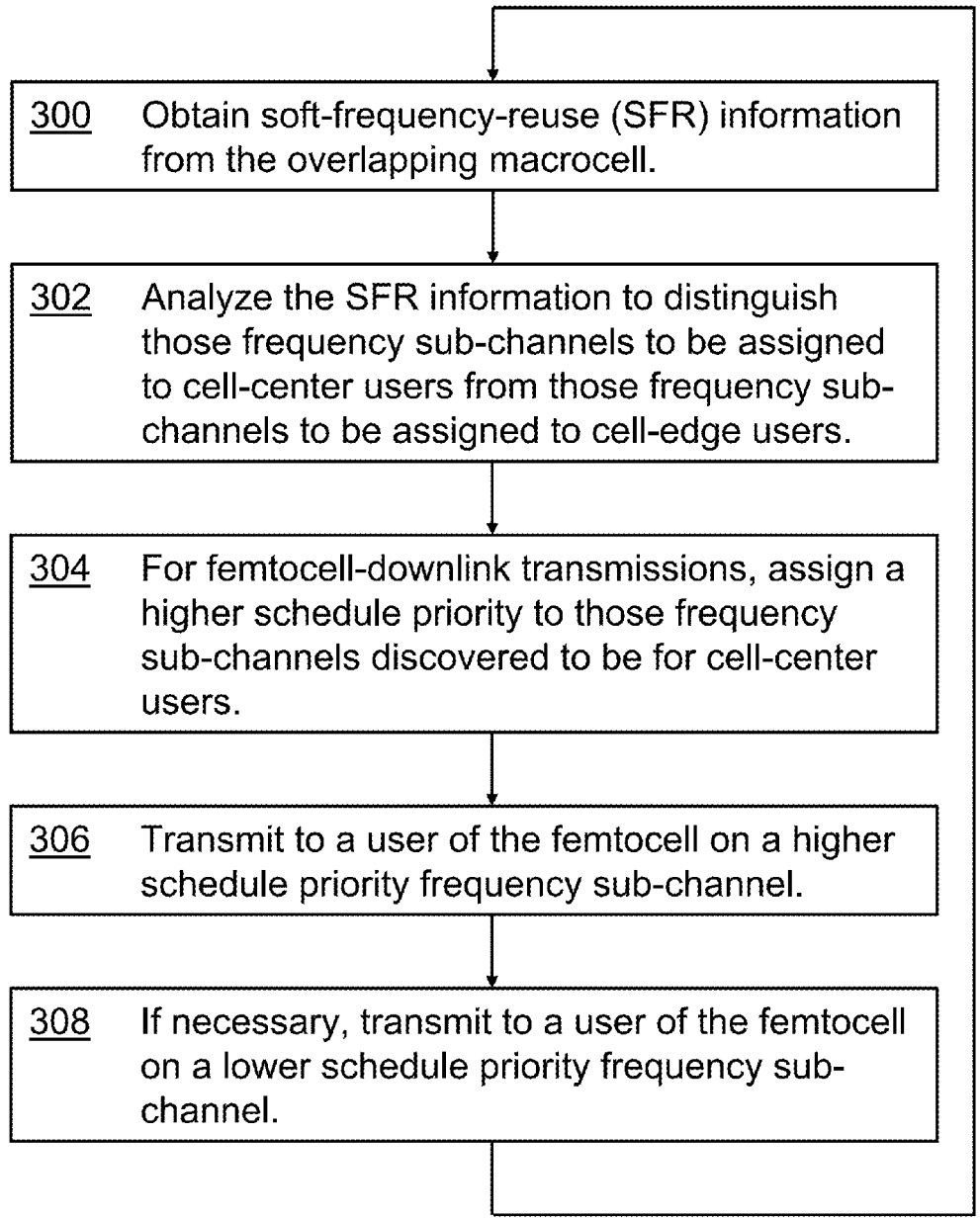
FIG. 3 is a flowchart of an exemplary method for a femtocell to reduce signal interference with an overlapping macrocell.
Figure 4:
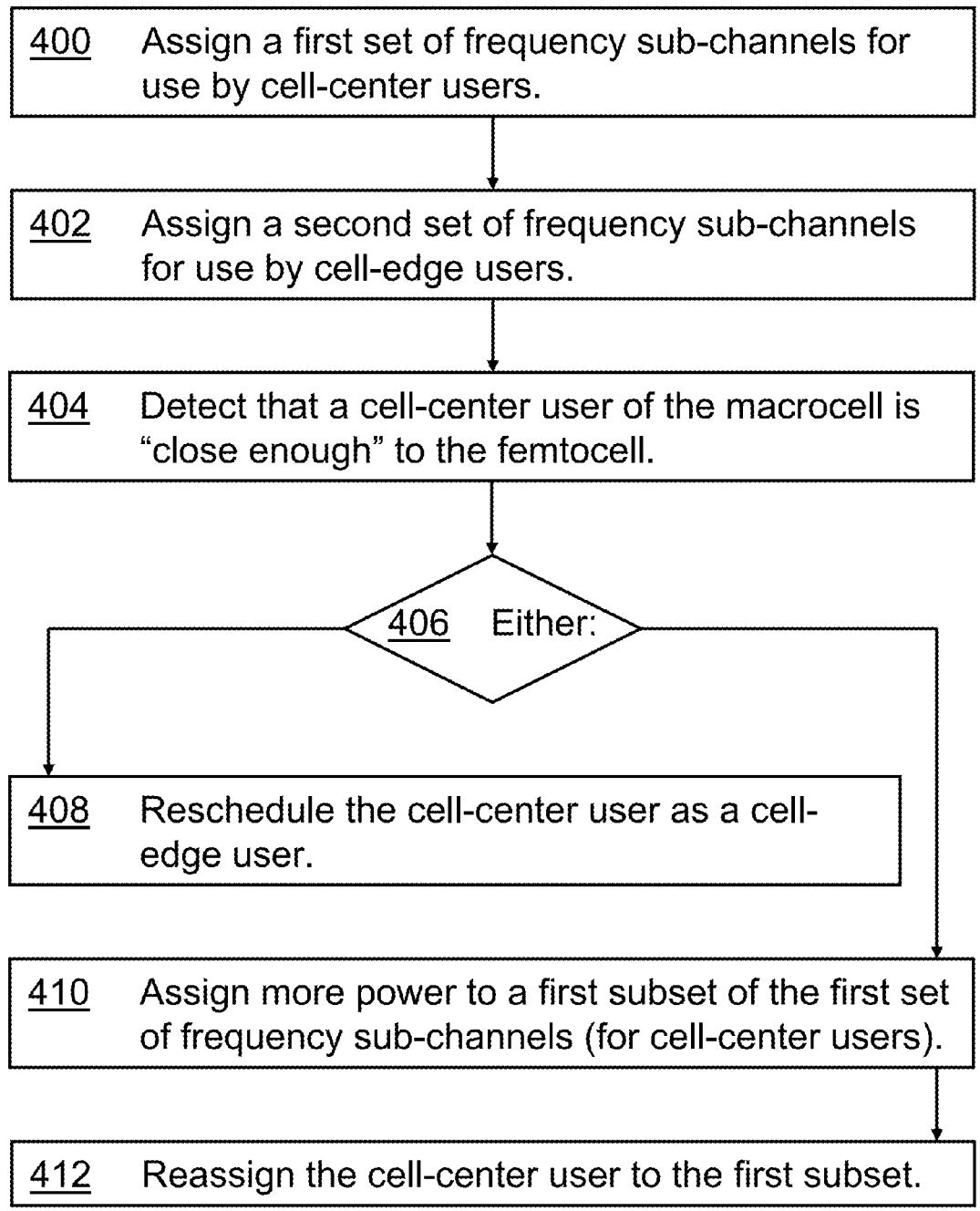
FIG. 4 is a flowchart of exemplary methods for a macrocell to reduce signal interference with an overlapping femtocell.
Figure 5A:
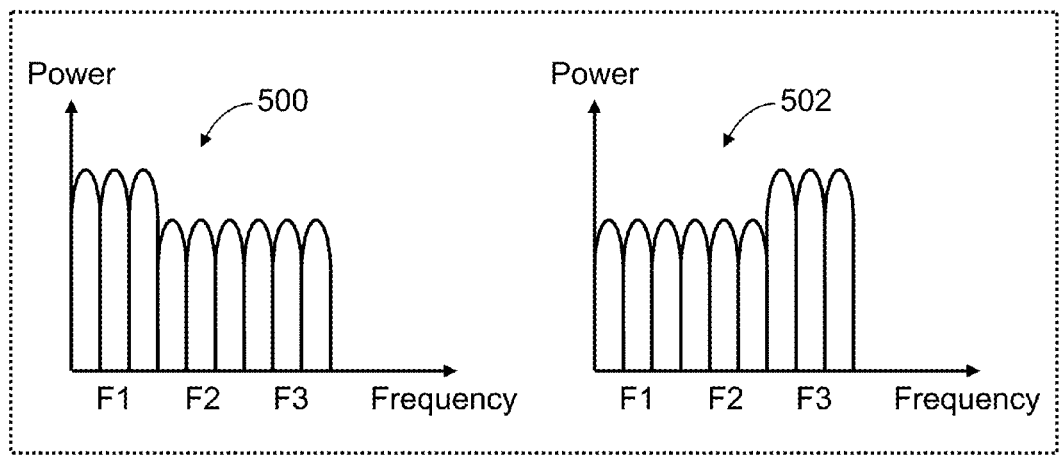
FIGS. 5a and 5b are graphs of power profiles for frequency sub-channels assigned by a macrocell.

Before proceeding to FIGS. 3 and 4 and a discussion of embodiments of the present invention, a short review of frequency reuse is in order. FIG. 5a portrays two examples of how transmission power is assigned to frequency sub-channels used for communications. In the power-spectrum graph 500, the frequency sub-channels denoted F1 are assigned a higher power profile than is assigned to the other frequency sub-channels F2 and F3. The power-spectrum graph 502 assigns more power to frequency sub-channels F3. Ignoring femtocells for the moment, one macrocell 100 may use the spectrum 500 while a neighboring macrocell (not illustrated in the figures) uses the spectrum 502. The differences in assigned power spectra 500, 502 for the neighboring macrocells decreases transmission interference between the neighboring macrocells. The controllers of the neighboring macrocells coordinate their spectra with one another (possibly via over-the-air communications or via the X2 backhaul interface 204) to reduce interference and may change their power spectra through time as necessary.

As described above in the Background section, neighboring macrocells reduce interference when a user 108 of the macrocell 100 moves toward a neighboring macrocell. The user 108 is "handed off," that is, the user 108 starts using the strongest signal (or one of the strongest signals) it receives thus changing its biggest source of interference into a useful communications channel.

Turning now to FIG. 3, a typical scenario involving aspects of the present invention is one in which the user 108 of the macrocell 100 approaches the femtocell 104. As measured by signal interference from the femtocell 104, the approach is "close enough" that, if the femtocell 104 were just another macrocell, the user 108 would be tempted to hand off to the femtocell 104. However, the user 108 is not authorized to (or does not wish to) hand off to the femtocell 104. To handle this situation, the femtocell 104 runs the exemplary method shown in FIG. 3.

The method begins in step 300 where the femtocell 104 receives soft-frequency-reuse ("SFR") information from the overlapping macrocell 100. This SFR information can include pattern and profile information such as the power spectra assigned to frequency sub-channels (see FIG. 5a). Well known techniques are available for the femtocell 104 to discover this information. In some embodiments, the femtocell 104 receives this information as Relative-Narrowband-TX-Power-Indicator messaging over the X2 backhaul communications interface 204. In other embodiments, the femtocell 104 decodes this information by directly measuring the downlink reference signals transmitted by the macrocell 100.

In step 302, the femtocell 104 analyzes the SFR information received from the macrocell 100. The femtocell 104 can distinguish between frequency sub-channels to be assigned by the macrocell 100 to cell-center users and frequency sub-channels to be assigned to cell-edge users. The reasoning here is that when the user 108 is near the center of the macrocell 102 (ignoring for the moment the femtocell's possibly interfering presence), transmissions from the macrocell 100 to the user 108 can be at a lower power setting. When the user 108 approaches the edge of the macrocell 102, the transmissions are at a higher power to overcome possible interference from a neighboring macrocell.

Based on its analysis of the SFR information, the femtocell 104 in step 304 assigns a higher schedule priority to those frequency sub-channels assigned by the macrocell 100 for use by the macrocell's cell-center users. The femtocell 104 abides by this priority schedule in step 306 when it transmits on a cell-center frequency sub-channel to its user 110. In the scenarios where the femtocell 104 is near the edge of the macrocell 102 (e.g., as in FIG. 1a), using a lower power cell-center frequency sub-channel for its own transmissions decreases the amount of interference between the femtocell 104 and the macrocell 100 because the user 108 of the macrocell 100 (when near the edge of the macrocell 102 and thus near the femtocell 104) uses a cell-edge frequency sub-channel. (In the scenarios where the femtocell 104 is near the center of the macrocell 100, the macrocell 100 can take further actions to reduce signal interference as described below in reference to FIG. 4.)

Optional step 308 is just a note that, in certain situations, the femtocell 104 may need to use one of the cell-edge (higher power) frequency sub-channels.

The femtocell 104 repeats the method of FIG. 3 either periodically or on discovering that the SFR information from the macrocell 100 has changed (as it is expected to do often as the macrocell 100 changes its power spectra in coordination with its neighboring macrocells).

According to aspects of the present invention, FIG. 4 presents two methods that the macrocell 100 can pursue in order to reduce signal interference with the femtocell 104. In the first two steps, the macrocell 100 assigns some frequency sub-channels for use by its cell-center users (step 400) and other frequency sub-channels for use by its cell-edge users (step 402). These are the same assignments detected by the femtocell 104 in step 302 of FIG. 3, as discussed above. In making the specific assignments, the macrocell 100 coordinates with neighboring macrocells to reduce signal interference with them.

In the scenario of FIG. 4, the user 108 of the macrocell 100 is a cell-center user, that is, because the user 108 is operating away from the edge of the macrocell 102, the user 108 is able to use one of the lower power frequency sub-channels. However, the femtocell 106 is also located away the edge of the macrocell 102, as depicted in FIG. 1b. The user 108 and the femtocell 104 come into potential conflict when the user 108 moves "close enough" to the femtocell 104. The macrocell 100 detects this event (that is, the event in which the femtocell 104 is located away from the edge of the macrocell 102 and in which the cell-center user 108 is close enough to the femtocell 104) in step 404.

One way for the macrocell 100 to detect that its user 108 is close enough to the femtocell 104 for signal interference to be a problem is based on the standard technique whereby the user 108 periodically reports its "neighbor list" to the macrocell 100. This neighbor list typically lists those controllers whose signals are currently being received by the user 108 along with an indication of the strength of each signal. In step 404, the reported neighbor list includes the femtocell 104. The macrocell 100 determines that its user 108 is close enough to the femtocell 104 when the signal strength received from the femtocell 104 as reported by the user 108 is above a threshold or when it is high in relation to the other reported signals. In normal operation (that is, where the femtocell 104 is replaced by a neighboring macrocell), this determination that the user 108 is "close enough" would trigger a hand off of the user 108 to the controller producing the strongest signal as received by the user 108. In the scenario of FIG. 4, however, the user 108 cannot be handed off to the femtocell 104 (e.g., the user 108 is not authorized to access the femtocell 104 or does not wish to).

Having decided that its cell-center user 108 is close enough to the femtocell 104, the macrocell 100, in decision box 406, proceeds to either step 408 or to step 410. These two options would normally be two separate embodiments, but both options could be embodied in one macrocell 100.

If the macrocell 100 chooses to proceed to the option of step 408, then the macrocell 100 reschedules the user 108 as a cell-edge user (even though the user 108 is still away from the edge of the macrocell 102). The frequency sub-channels assigned to cell-edge users have a higher power profile, and this higher power allows the user 108 to overcome interference with the nearby femtocell 104. If the user 108 later moves away from the femtocell 104, then it may be rescheduled again as a cell-center user.

If instead the macrocell 100 chooses to proceed to the option of step 410, then the macrocell 100 divides the frequency sub-channels assigned for cell-center users into two subsets. (Of course, this assignment may be done whenever the macrocell 100 assigns the frequency sub-channels into groups for use by cell-edge users and by cell-center users. There is no necessity that the macrocell 100 wait until its user 108 is close enough to the femtocell 104 to make the assignment of step 410.) In the course of the dividing, the macrocell 100 sets up a staged power profile wherein one subset of the frequency sub-channels assigned for use by cell-center users is given higher power than the other frequency sub-channels. This is illustrated in the spectrum 504 of FIG. 5b. In this example, the cell-edge users are still given the highest power (frequency sub-channels F1), while some of the cell-center users are given higher power (frequency sub-channels F2) than the other cell-center users (frequency sub-channels F3).

Figure 5B:
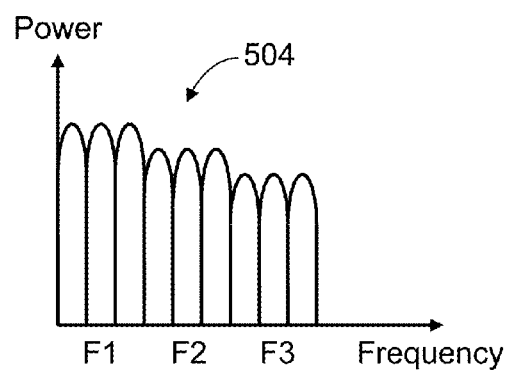

The macrocell 100 gives a higher schedule priority, for the purposes of the close enough user 108, to the subset of the cell-center frequency sub-channels with higher power (F2 in FIG. 5*b*). Thus, the user 108 is given somewhat more power to allow it to overcome signal interference from the femtocell 104. If the user 108 moves away from the femtocell 104, then it can be rescheduled to use a lower power frequency sub-channel (F3).

In view of the many possible embodiments to which the principles of the present invention may be applied, it should be recognized that the embodiments described herein with respect to the drawing figures are meant to be illustrative only and should not be taken as limiting the scope of the invention. For example, cellular terminology has been used throughout although the invention can be used in any frequency reuse communications environment. Therefore, the invention as described herein contemplates all such embodiments as may come within the scope of the following claims and equivalents thereof.

We claim:

1. A method for a macrocell to reduce signal interference with a femtocell that overlaps the macrocell, the method comprising:

assigning, by the macrocell, a first set of frequency sub-channels to be used by cell-center users of the macrocell located in a cell-center area of the macrocell;

assigning, by the macrocell, a second set of frequency sub-channels to be used by cell-edge users of the macrocell located in a cell-edge area of the macrocell;

receiving, by the macrocell from a cell-center user, a neighbor list, the neighbor list comprising the femtocell;

receiving, by the macro cell from the cell-center user, an indication that a strength of a signal received from the femtocell is above a threshold; and scheduling, by the macrocell, in response to the indication, the cell-center user to communicate via one or more frequency sub-channels included in a subset of the first set of frequency sub-channels, the frequency sub-channels in the subset being assigned a higher power than the other frequency sub-channels in the first set of frequency sub-channels.

2. A controller for controlling a macrocell, the controller comprising:

a transceiver; and a processor operatively connected to the transceiver and configured for assigning a first set of frequency sub-channels to be used by cell-center users of the macrocell located in a cell-center area of the macrocell, for assigning a second set of frequency sub-channels to be used by cell-edge users of the macrocell located in a cell-edge area of the macrocell, for receiving, via the transceiver from a cell-center user, a neighbor list, the neighbor list comprising the femtocell, for receiving, via the transceiver from the cell-center user, an indication of a strength of a signal received from the femtocell, and for scheduling, in response to the indication, the cell-center user to communicate via one or more frequency sub-channels included in a subset of the first set of frequency sub-channels, the frequency sub-channels in the subset being assigned a higher power than the other frequency sub-channels in the first set of frequency sub-channels.

* * * * *